(12) United States Patent
Yuan et al.

(10) Patent No.: US 11,325,364 B2
(45) Date of Patent: May 10, 2022

(54) LITHO LAMINATING MACHINE

(71) Applicant: BOBST GRENCHEN AG, Grenchen (CH)

(72) Inventors: Zheng Yuan, Jiangsu (CN); Thuc-Binh Phan, Solothurn (CH); Maurizio Gugel, Malleray (CH)

(73) Assignee: BOBST GRENCHEN AG, Grenchen (CH)

( * ) Notice: Subject to any disclaimer, the term of this patent is extended or adjusted under 35 U.S.C. 154(b) by 0 days.

(21) Appl. No.: 17/309,986

(22) PCT Filed: Jan. 18, 2019

(86) PCT No.: PCT/CN2019/072297
§ 371 (c)(1),
(2) Date: Jul. 7, 2021

(87) PCT Pub. No.: WO2020/147101
PCT Pub. Date: Jul. 23, 2020

(65) Prior Publication Data
US 2022/0080716 A1    Mar. 17, 2022

(51) Int. Cl.
*B32B 37/00* (2006.01)
*B31F 1/28* (2006.01)
*B31F 5/04* (2006.01)

(52) U.S. Cl.
CPC .......... *B32B 37/0053* (2013.01); *B31F 1/289* (2013.01); *B31F 5/04* (2013.01)

(58) Field of Classification Search
CPC .... B31F 5/04; B31F 1/20; B31F 1/225; B31F 1/28; B31F 1/2804; B31F 1/289; B32B 29/08; B32B 2317/127; B32B 37/0053; B32B 37/22; B32B 37/18; Y10T 156/1097; Y10T 156/1025; Y10T 156/1734; Y10T 156/1093; B65H 29/48; B65H 37/04;
(Continued)

(56) References Cited
U.S. PATENT DOCUMENTS 3,306,805 A * 2/1967 Klein ...................... B31F 1/289
                                                            156/292
2015/0053349 A1    2/2015 Mori et al.

FOREIGN PATENT DOCUMENTS

CN            2710891 Y     7/2005
CN          201338413 Y    11/2009
(Continued)

OTHER PUBLICATIONS

"Lamina Automatic Litho-Laminator" from CORREXPT.COM Feb. 2022.*
(Continued)

*Primary Examiner* — John L Goff, II
(74) *Attorney, Agent, or Firm* — Bookoff McAndrews, PLLC

(57)        ABSTRACT

The invention relates to a litho laminating machine (10) having a frame (18), an accelerator table (20) mounted to the frame (18) so as to be pivotable around a pivot axis (P), a plurality of accelerator rollers (24) mounted on the table (20), and a motor (42) for driving the accelerator rollers (24), characterized in that the motor (42) is mounted to the frame (18), with a rotatable transmission element (30, 36) being mounted so as to have an axis of rotation which coincides with the pivot axis (P), both the motor (42) and the accelerator rollers (24) being connected to the transmission element (30, 36).

10 Claims, 3 Drawing Sheets

Figure 1:
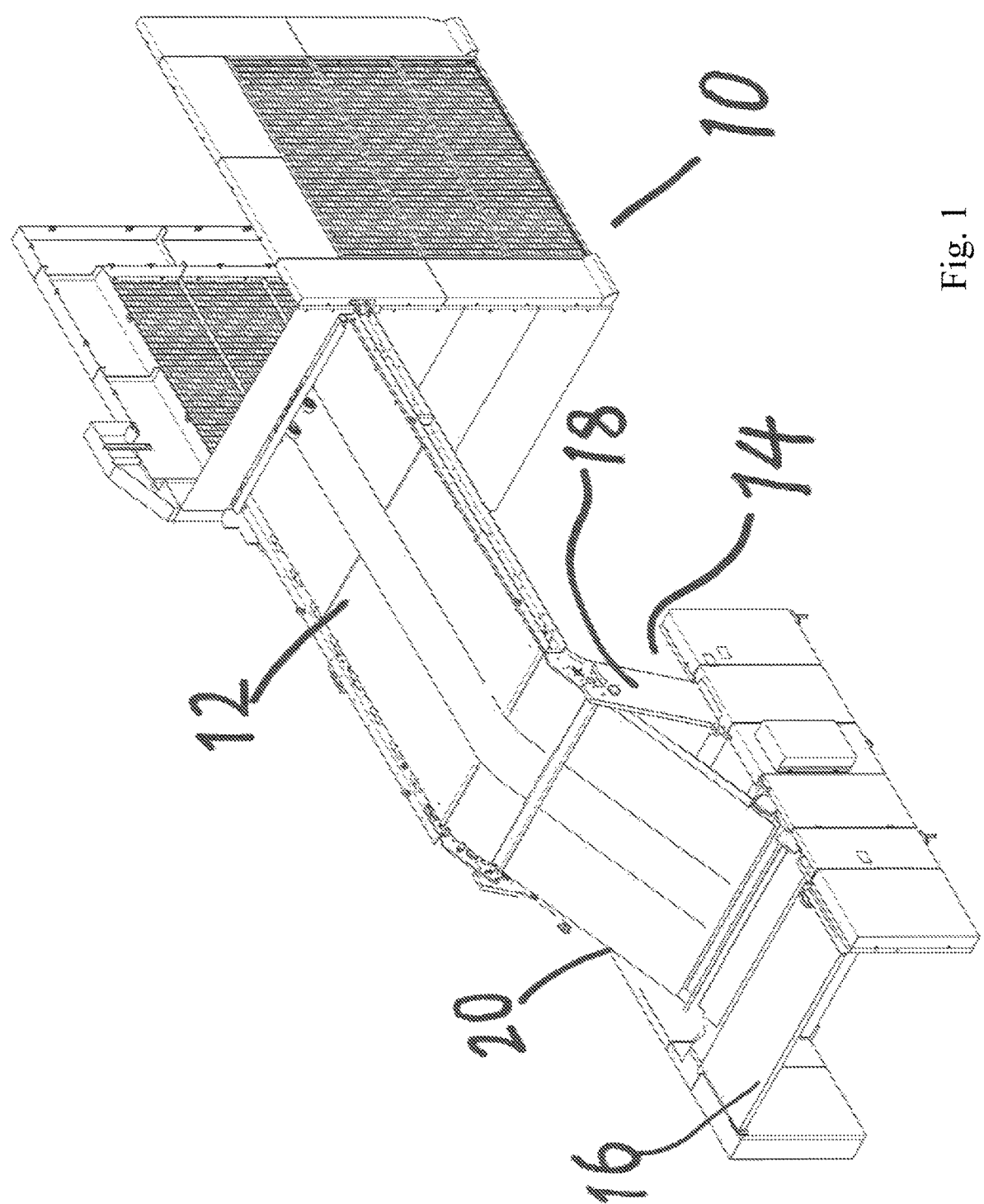

(58) Field of Classification Search
CPC . B65H 11/02; B65H 5/04; B65H 5/06; B65H 5/066
USPC .................................. 156/210, 462; 271/264
See application file for complete search history.

(56) References Cited

FOREIGN PATENT DOCUMENTS

| | | |
|---|---|---|
| CN | 202225470 U | 5/2012 |
| CN | 107322987 A | 11/2017 |
| CN | 107567383 A | 1/2018 |
| WO | WO-9729905 A1 * | 8/1997 ............. B32B 37/18 |

OTHER PUBLICATIONS

International Search Report dated Oct. 8, 2019 in counterpart International Patent Application No. PCT/CN2019/072297 (2 pages, in English).

* cited by examiner

_LITHO LAMINATING MACHINE_

CROSS-REFERENCE TO RELATED
APPLICATION(S)

This application is a National Stage under 35 U.S.C. § 371 of International Application No. PCT/CN2019/072297, filed Jan. 18, 2019, the contents of which is incorporated by reference in its entirety.

The invention relates to a litho laminating machine having a frame, an accelerator table mounted to the frame so as to be pivotable around a pivot axis, a plurality of accelerator rollers mounted on the table, and a motor for driving the accelerator rollers.

A litho laminating machine laminates printed sheets accurately onto single faced corrugated cardboard or corrugated sheet. In general, the corrugated board is provided in a continuous manner from a large roll, and the printed sheets have to be applied onto the corrugated board in an aligned manner. To this end, the accelerator table accelerates a respective sheet in a suitable manner so as to ensure that it arrives onto the corrugated board at the desired position.

Regarding the accelerator table, a couple of conflicting requirements exist. On the one hand, the drive for the accelerator rollers has to be powerful so as to allow the sheets to be quickly accelerated. On the other hand, the accelerator table shall have a low weight as it has to be moved from an operating position into a maintenance position from time to time.

The object of the invention is to provide a litho laminating machine which fulfils these requirements as good as possible.

To this end, a litho laminating machine as defined above is provided, characterized in that the motor is mounted on the frame, with a rotatable transmission element being mounted so as to have an axis of rotation which does not coincides with the pivot axis, both the motor and the accelerator rollers being connected to the transmission element. The invention is based on the concept of mounting the relatively heavy motor at the frame and transmitting the drive power towards the accelerator rollers via a rotating transmission element mounted coaxially with the pivot axis of the accelerator table. This allows displacing the accelerator table around the pivot axis without there being a need to disconnect the transmission between the motor and the accelerator rollers. As the motor is mounted to the frame, it does not need to be lifted when the accelerator table is pivoted from the operating position into the maintenance position.

The transmission element preferably comprises a drive pulley, the accelerator rollers being connected to the drive pulley by means of a belt drive. A belt drive involves a low inertia so that the accelerator rollers can be quickly accelerated to the desired speed.

A belt, for example a toothed belt, in particular a carbon belt, is particularly suitable for connecting the accelerator rollers to the drive pulley.

At the accelerator table, at least one tension roller is provided for maintaining the desired tension of the belt drive.

The belt drive can also comprise one or more intermediate rollers for guiding the belt in a suitable manner or for separating a longer drive train into shorter segments.

Preferably, the transmission element comprises a driven pulley, the motor being connected to the driven pulley by means of a belt engaging at a motor pulley. On the motor side as well, a drive belt ensures a low inertia of the drive train.

The diameter of the motor pulley is larger than the diameter of the driven pulley so as to increase of the couple from the motor towards the accelerator rollers.

The motor can in particular be an electric motor which can be easily controlled in a very precise manner regarding the speed of rotation.

A lifting mechanism can be provided for lifting the accelerator table from an operating position to a maintenance position. Such lifting mechanism can comprise a gas spring and/or a lifting cylinder.

Figure 2:
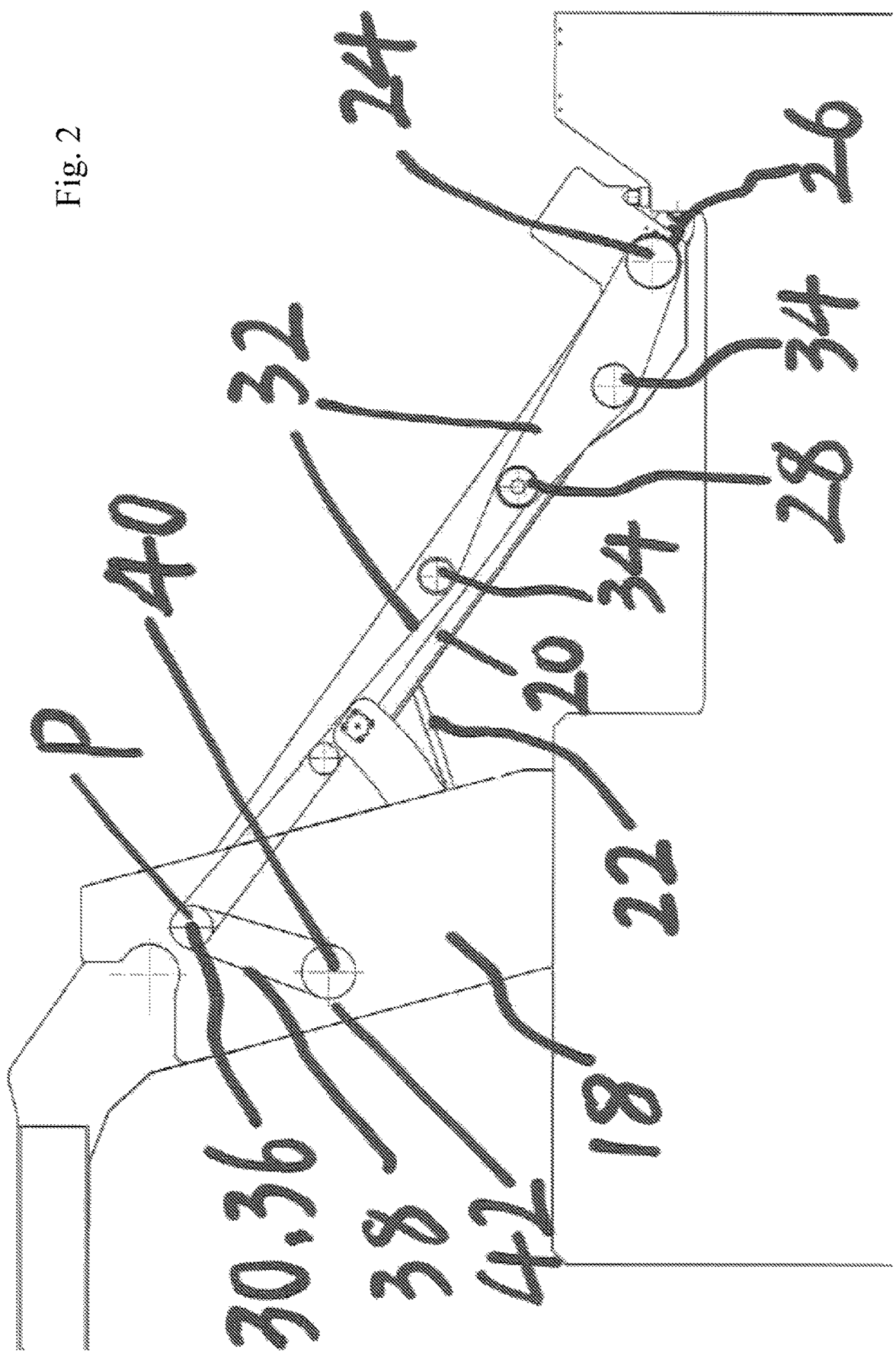
Figure 3:
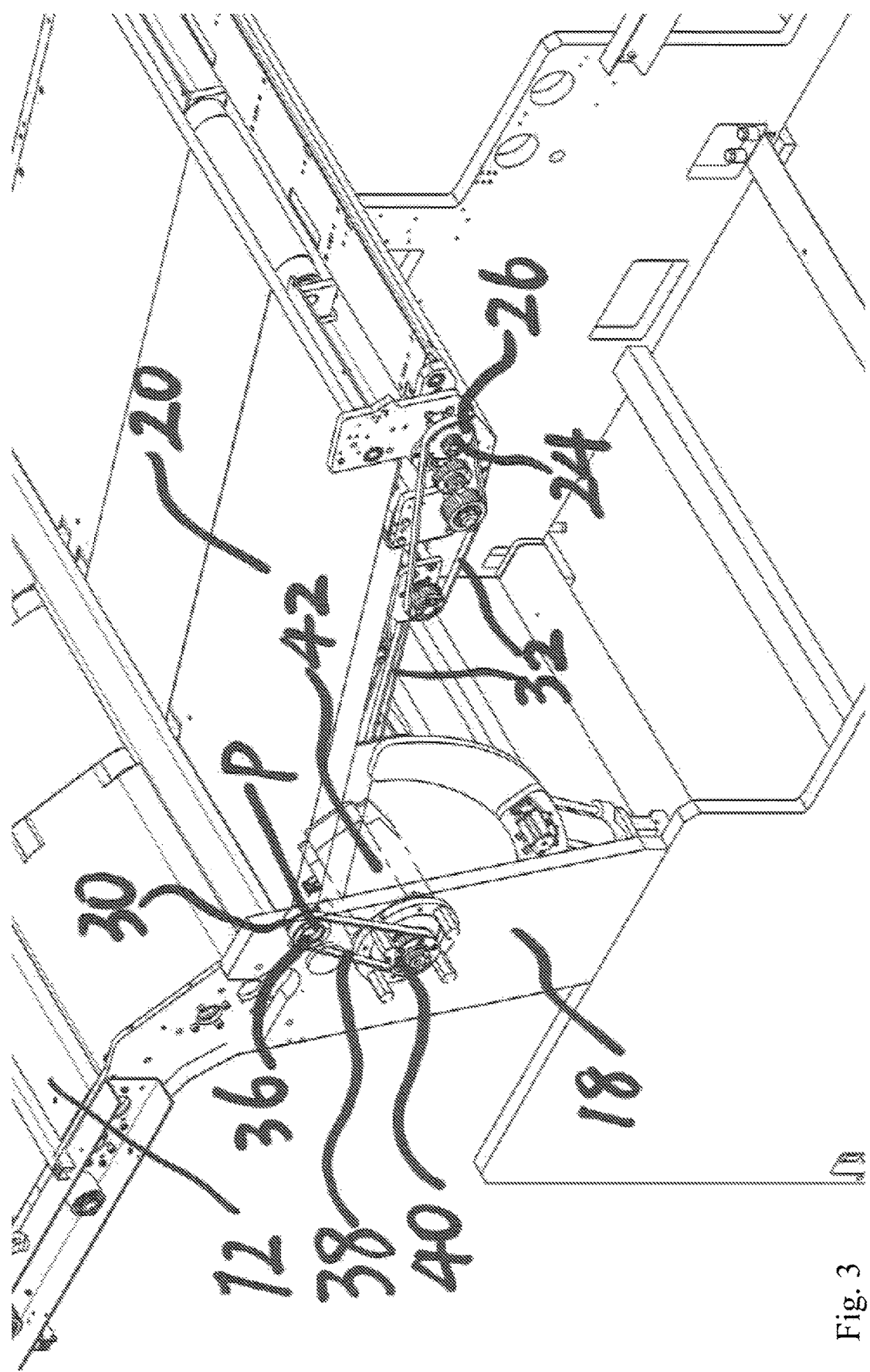

The invention will now be described with reference to the enclosed drawings. In the drawings, FIG. 1 shows in a perspective view a part of a litho laminating machine having an accelerator table;

FIG. 2 shows in a side view the table of the machine of FIG. 1 in an operating position; and FIG. 3 shows in a perspective view the table of the machine of FIG. 1 in a raised maintenance position.

FIG. 1 shows the upstream portion of a litho laminating machine 10. It has a supply 12 for printed sheets, and a schematically shown unwinding mechanism 14 for corrugated board. The printed sheets are applied onto the corrugated board and are pressed onto the corrugated board in a laminating device 16. Further components which are arranged downstream at machine 10 are not shown.

Machine 10 comprises a frame 18 to which an accelerator table 20 is pivotally mounted (please see also FIG. 2). Table 20 is mounted to frame 18 so as to be pivotable around a pivot axis P. A schematically shown lifting mechanism 22 is provided for lifting accelerator table 20 from the operating position shown in FIG. 2 towards a raised maintenance position shown in FIG. 3.

At the end which is opposite to pivot axis P, accelerator rollers 24 (of which only their drive axis is visible here) are provided which are used for advancing the individual printed sheets with the desired speed onto the corrugated board. The accelerator rollers 24 are driven with a belt drive comprising a pulley 26 associated with accelerator rollers 24, intermediate pulleys 28, and a drive pulley 30. The axis of rotation of drive pulley 30 coincides with pivot axis P.

Between drive pulley 30 and accelerator pulley 26, two belts 32 are used which here are toothed belts comprising carbon fibres. Tension rollers 34 are provided which allow controlling the tension within the drive belts.

A driven pulley 36 is mounted to drive pulley 30 so as to rotate together therewith as a unit. Driven pulley 36 is engaged by a pulley toothed belt 38 which in turn is received on a motor pulley 40. Motor pulley 40 is driven by a motor 42 which here is an electric motor.

Motor pulley 40 here has a diameter which is larger than the diameter of the driven pulley. Accordingly, an increased couple is formed from motor 42 towards accelerator rollers 24.

With the belt drives, a rotation of motor pulley 40 can be transmitted towards accelerator rollers 24, with the thus formed drive train having a low inertia so that the speed of the accelerator rollers can be changed very quickly. As the axis of rotation of driven pulley 36 and drive pulley 30 coincides with pivot axis P, moving accelerator table 20 from the operating position towards the maintenance position has no effect on the transmission from motor 42 towards accelerator rollers 24. Further, an accelerator table 20 is achieved which has a low weight as the motor is mounted to frame 18.

The invention claimed is:

1. A litho laminating machine comprising:
   a frame;
   an accelerator table mounted to the frame so as to be pivotable around a pivot axis;
   a plurality of accelerator rollers mounted on the accelerator table;
   a motor configured to drive the plurality of accelerator rollers, the motor being mounted to the frame; and
   a rotatable transmission element mounted so as to have an axis of rotation which coincides with the pivot axis,
   wherein both the motor and the plurality of accelerator rollers are connected to the rotatable transmission element.

2. The litho laminating machine of claim 1, wherein the rotatable transmission element comprises a drive pulley, and the plurality of accelerator rollers are connected to the drive pulley by means of a belt drive.

3. The litho laminating machine of claim 2, wherein the belt drive is a carbon belt.

4. The litho laminating machine of claim 2, wherein the belt drive is a toothed belt.

5. The litho laminating machine of claim 2, further comprising at least one tension roller.

6. The litho laminating machine of claim 2, further comprising at least one intermediate pulley.

7. The litho laminating machine of claim 2, wherein the rotatable transmission element comprises a driven pulley, and the motor is connected to the driven pulley by means of a belt engaging at a motor pulley.

8. The litho laminating machine of claim 7, wherein a diameter of the motor pulley is larger than a diameter of the driven pulley.

9. The litho laminating machine of claim 1, wherein the motor is an electric motor.

10. The litho laminating machine of claim 1, further comprising a lifting mechanism configured to lift the accelerator table from an operating position to a maintenance position.

* * * * *